United States Patent
Lobinger et al.

(10) Patent No.: US 7,050,833 B2
(45) Date of Patent: May 23, 2006

(54) METHOD FOR CONTROLLING BEAM FORMATION IN A MOBILE RADIO COMMUNICATION SYSTEM AND A BASE STATION THEREFOR

(75) Inventors: Andreas Lobinger, Miesbach (DE); Bernhard Raaf, München (DE); Alexander Seeger, Feldkirchen (DE); Ralf Wiedmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 10/478,286

(22) PCT Filed: May 15, 2002

(86) PCT No.: PCT/DE02/01746

§ 371 (c)(1),
(2), (4) Date: Nov. 18, 2003

(87) PCT Pub. No.: WO02/095981

PCT Pub. Date: Nov. 28, 2002

(65) Prior Publication Data

US 2004/0152491 A1    Aug. 5, 2004

(30) Foreign Application Priority Data

May 18, 2001 (DE) ................ 101 24 397

(51) Int. Cl.
*H04B 1/38* (2006.01)
*H04M 1/00* (2006.01)

(52) U.S. Cl. .................. 455/562.1; 455/69
(58) Field of Classification Search ............ 455/69, 455/562.1, 561, 88, 418–420; 342/368, 373, 342/374

See application file for complete search history.

(56) References Cited

U.S. PATENT DOCUMENTS 6,859,503 B1 * 2/2005 Pautler et al. ............... 375/299

FOREIGN PATENT DOCUMENTS

| GB | 2 130 798 A | * | 6/1984 |
| WO | WO 99/56407 | | 11/1999 |
| WO | WO 99/59255 | | 11/1999 |
| WO | WO 00/72464 | | 11/2000 |
| WO | WO 02/056501 | * | 7/2002 |

OTHER PUBLICATIONS

3 GPP TS 25.214 3rd Generation Partnership Project; Technical Specification Group Radio Access Network; Physical layer procedures (FDD) (Release 1999).
XP-002197993 "Preliminary version of algorithm and Simulation results for Tx Diversity with more than 2 Tx Antennas", pp. 1/4-4/4.

* cited by examiner

*Primary Examiner*—Nguyen T. Vo
(74) *Attorney, Agent, or Firm*—Bell, Boyd & Lloyd LLC

(57) ABSTRACT

A method is provided for controlling the beam formation of downlink signals, which are emitted in a mobile radio communications system by base stations of a first and a second radio cell to a mobile station, whereby the base stations are configured to emit a weighted downlink signal to the mobile station, using a weighting vector. The method includes the steps of determination of a weighting vector record in the mobile station and the base stations of the first and second radio cell; selection of an optimal weighting vector in the mobile station and transmission of a code word that is assigned to the optimal weighting vector to the base stations; and weighted emission of the downlink signal to each base station using the weighted vector that has been assigned to the code word. In the base stations, the weighting vectors are assigned to the code words in various ways, so that upon receipt of an identical code word, the base stations weight the downlink signal using different weighting vectors.

21 Claims, 3 Drawing Sheets

METHOD FOR CONTROLLING BEAM FORMATION IN A MOBILE RADIO COMMUNICATION SYSTEM AND A BASE STATION THEREFOR

BACKGROUND OF THE INVENTION

The present invention relates to a method for controlling the beam formation of a downlink signal which is radiated by base stations of a first and a second radio cell to a mobile station in a mobile radio communication system. The present invention also relates to a base station suitable for implementing such a method.

In mobile radio communication systems such as the UMTS system, for example, base stations having a number of antennas are employed to utilize space diversity. These antennas are weighted using different weighting factors for data transmission to a mobile station; i.e., a downlink signal to be transmitted to the mobile station is applied to the latter in each case multiplied by the weighting factor assigned to the relevant antenna. The weighting factors are generally complex numbers which include an absolute and a phase component. A radiation lobe in the direction of the location of the relevant mobile station is thereby produced at the base station for each mobile radio station in a cell (beam formation). The weighting factors of the individual antennas are combined to form a weighting vector.

In so-called closed-loop transmit diversity schemes, the required weighting vector is estimated at the mobile station, quantized and transmitted via the uplink dedicated physical control channel to the base station where it is used for beam formation.

If the mobile station moves from a first radio cell of the mobile radio communication system to a second, a communication connection supported by it must be switched from the base station of the first radio cell to that of the second. This process is known as handover.

In the case of so-called soft handover, there is an intermediate state in which identical user data is transmitted in the downlink to the mobile station from the base stations of two or more radio cells. In industry literature, a distinction is drawn between a soft handover in the narrower sense whereby the radio cells each correspond to different base stations, and a softer handover whereby the radio cells correspond to different sectors of a base station. Where soft handover is referred to in the following, both alternatives will always be considered included.

Normally, in the case of soft handover of a mobile station between two base stations employing space diversity, a common weighting vector is selected for both base stations. This common weighting vector is determined in such a way that it maximizes the incoming power, at the mobile station, of all the radio cells involved in the soft handover; i.e., a weighting vector W is sought for which the expression $$P = W^H(H_1^H H_1 + H_2^H H_2 + \ldots)W$$

is maximized, where H1HHi is the covariance matrix of the transmission channel of the ith base station involved in handover, to the mobile station. Consequently, all the base stations involved in the handover use the same weighting vector; i.e., they have the same spatial radiation characteristic.

FIG. 1 illustrates the above situation taking the example of the radiation lobes of two base stations BS1, BS2 and a mobile station MS located in the boundary region between the radio cells of the two base stations. As the two base stations BS1, BS2 apply the same weighting vector, their radiation lobes are identically oriented, and the mobile station MS is, in each case, located at the edge of the two lobes and therefore does not have optimum reception of the two base stations.

In order to increase the number of mobile stations that can be simultaneously supplied in a radio cell while at the same time minimizing interference in adjacent cells, it is intrinsically desirable to increase the number of antennas at the base station in order to be able to produce more directive radiation lobes. As FIG. 2 shows, this entails the risk of making a conventional soft handover impossible, as the radiation lobes of both antennas no longer overlap in the boundary region of the cells. The mobile station MS here receives none of the downlink signals of the base stations BS1, BS2 with sufficient quality.

An object of the present invention is therefore, to provide a method for controlling the beam formation of a downlink signal which enables downlink signals to be supplied to a mobile station which simultaneously communicates with base stations of at least two radio cells, the mobile station being simultaneously supplied with optimum quality from at least two of the base stations, and also to specify a base station suitable for implementing a method of this kind.

SUMMARY OF THE INVENTION

Accordingly, the method of the present invention involves the usual steps of specifying a set of weighting vectors at the mobile station and the base stations of the first and second radio cell, each weighting vector being assigned a code word, of selecting an optimum weighting vector from the vectors of the set at the mobile station and transmitting the code word assigned to the optimum weighting vector to the base stations, and of weighted radiating of the downlink signal to each base station using the weighting vector assigned to the code word.

The distinctive feature of the present method is that the weighting vectors are differently assigned to the code words at the base stations of the first and second radio cell so that these base stations weight the downlink signal with different weighting vectors on receipt of an identical code word. More precisely, if a mobile station transmits a code word which encodes a weighting vector which, if it is used by the first base station, provides the mobile station with optimum reception of the downlink signal of the first base station, this weighting vector, if it is used by the second base station located at another site, is certain to be non-optimum, wherein every other weighting vector of the specified set is likely to be better.

Preferably, the set of weighting vectors is specified in such a way that, in each case, it contains at least one weighting vector corresponding to a transmission path of the first radio cell and at least one vector corresponding to a transmission path of the second radio cell. Assigning an identical code word to these two vectors at the respective base stations of the first and second radio cells ensures that, by transmitting a single code word at both base stations, suitable weighting vectors can be selected specifically for the base stations in each case.

If, in the foregoing and in the following, the discussion mainly relates to two radio cells or base stations, this should not be taken to mean that no more than two base stations can simultaneously radiate the downlink signal. If the downlink signal is also radiated by a base station of at least a third radio cell, the set of weighting vectors must include at least one weighting vector corresponding to a transmission path of at least a third radio cell and this weighting vector be assigned the same code word at the base station of the assigned third radio cell. Thus, the method according to the present invention can in principle, be extended to any number of radio cells or base stations.

To define the set of weighting vectors, weighting vectors preferably are measured at the mobile station and transmitted to the base station in a sequence whereby a first group of positions in the sequence is reserved for the transmission of weighting vectors corresponding to a transmission path of the first radio cell, and a second group of positions in the sequence is reserved for the transmission of weighting vectors corresponding to a transmission path of the second radio cell. As such, on receipt of the set of vectors from the subscriber station, each base station is able, on the basis of the position that a vector occupies in the sequence, to detect whether this is a vector measured for the downlink signal of this base station and specifically determined for use at this base station, or a vector assigned to another station.

There also can, of course, also be third and further groups of positions in the sequence if the subscriber station is intended to communicate simultaneously with more than two base stations.

If the number of groups is variable, particularly if the number of base stations involved in a soft handover is variable depending on the reception conditions, it is advisable for the subscriber station to transmit information concerning the number of groups to the base stations, so that the base stations can infer, on the basis of this information, which positions of the sequence belong to which group.

The positions of the various groups preferably follow one another cyclically in the sequence; i.e., in the case of two groups, one group includes even-numbered and the other odd-numbered positions, in the case of three groups, one includes the positions 1, 4, . . . , another the positions 2, 5, . . . etc.

An alternative possibility is that the weighting vectors measured at the mobile station are each transmitted to the base stations in conjunction with an indicator which designates the radio cell of the transmission path to which the weighting vector corresponds. As such, a weighting vector measured on any transmission path can be transmitted at each position of the sequence. In particular, each group may contain any number of vectors.

The two base stations preferably use two different rules for assigning a weighting vector transmitted in this way to a code word subsequently transmitted by the mobile station.

According to one embodiment, these rules are matched in such a way that, in the two rules, each code word is assigned a weighting vector corresponding to a transmission path of the first radio cell and a weighting vector corresponding to a transmission path of the second radio cell.

The number of vectors originating from measurements on transmission paths of a particular radio cell in the set of weighting vectors may be different for the individual radio cells; in particular, it may be greater than 1 for at least one radio cell and equal to 1 for at least one other. It is therefore advisable, according to a second, if at least one base station uses a rule in which each code word is assigned a different weighting vector, and at least one other base station uses another rule whereby each code word is assigned the same weighting vector. Thus the subscriber station can use diversity at one base station by transmitting different code words, while the other always simultaneously employs the same weighting vector generally corresponding to the best transmission path available to that station.

Another advantageous possibility is that at least one of the base stations uses a first rule in which a number of code words are assigned to an identical weighting vector, and that at least one other base station uses a second rule in which this number of code words is assigned different weighting vectors in each case. In particular, the code words may contain first and second bits, the first bits in each case specifying the weighting vector used by one base station and the second bits specifying the weighting vector used by the second base station. Thus, the subscriber station can use diversity at each of the base stations even though the number of weighting vectors available for selection at each base station may be less than in the case of the two abovementioned alternatives.

The weighting vectors at the mobile station are preferably specified by calculating a covariance matrix for each base station and selecting at least one weighting vector from the eigenvectors of each covariance matrix, the vectors selected being generally those whose eigenvectors have the highest absolute value.

If the beam formation control method described above is used in the context of a soft handover between the first and second radio cell, in the simplest case the set of weighting vectors may only include two vectors, and of the two code words required to designate these weighting vectors, it is the code word corresponding to the weighting vector assigned to the first radio cell at the base station of the first radio cell and corresponding to the weighting vector assigned the second radio cell at the base station of the second radio cell that is transmitted to the base stations. The selection of the weighting vectors used by the base stations then preferably remains unchanged for the duration of the handover, as transmission of the other code word in each case would result in the base station of the first radio cell using a weighting vector specified on the basis of the downlink signal of the second radio cell, and vice versa. As this is unlikely to result in improved reception, it is advisable not to change over the weighting vectors at the base stations for the duration of the handover.

It can be provided that, when handover is complete, the base station of the second radio cell retains the second rule for assigning the weighting vectors to the code words transmitted by the mobile station. In such a case, in the event of a new handover to a third radio cell, its base station, in turn, applies the first rule.

An alternative possibility is for the base station of the radio cell to go over to using the first rule once handover is complete. This alternative is easier to implement, as a base station which begins to communicate with a mobile station as part of a handover can then use the second rule in every case, without it being necessary to clarify which rule the other base station is using.

A base station suitable for implementing the method of the present invention is characterized in that it is set up to selectively use one of two or more different rules for selecting the weighting vectors on the basis of the code word transmitted. If only two stations are involved in a soft handover, two rules suffice; if a larger number of base stations are involved, a correspondingly larger number of rules are required.

Additional features and advantages of the present invention are described in, and will be apparent from, the following Detailed Description of the Invention and the Figures.

DETAILED DESCRIPTION OF THE INVENTION

Figure 1:
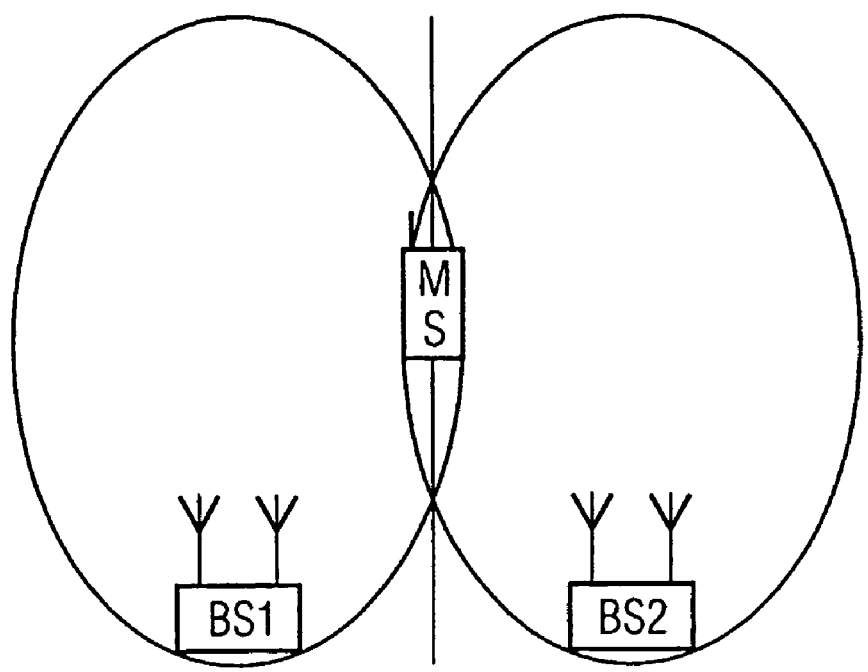
FIG. 1 schematically illustrates beam formation in a conventional mobile communication system whose base stations each have two antennas and radiate a downlink signal over a relatively wide solid angle.
Figure 2:
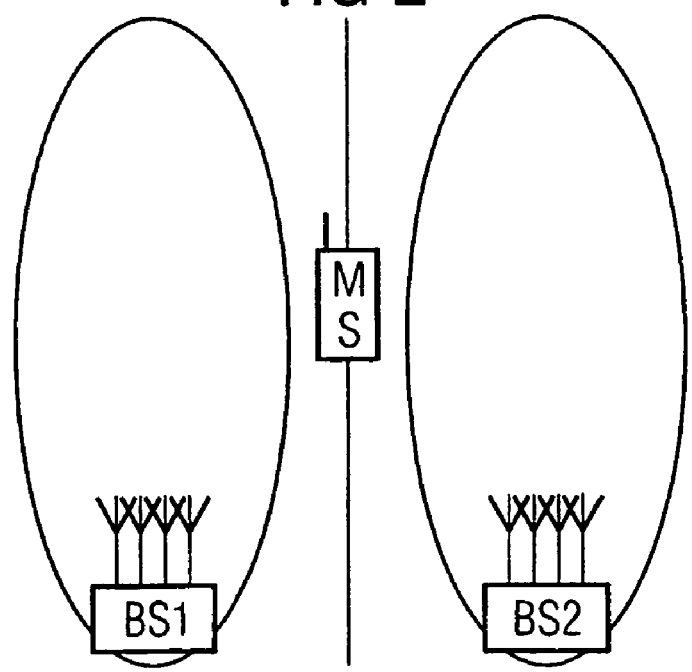
FIG. 2 shows a mobile radio communication system similar to that illustrated to FIG. 1, with base stations having relatively tightly focused radiation characteristics.
Figure 3:
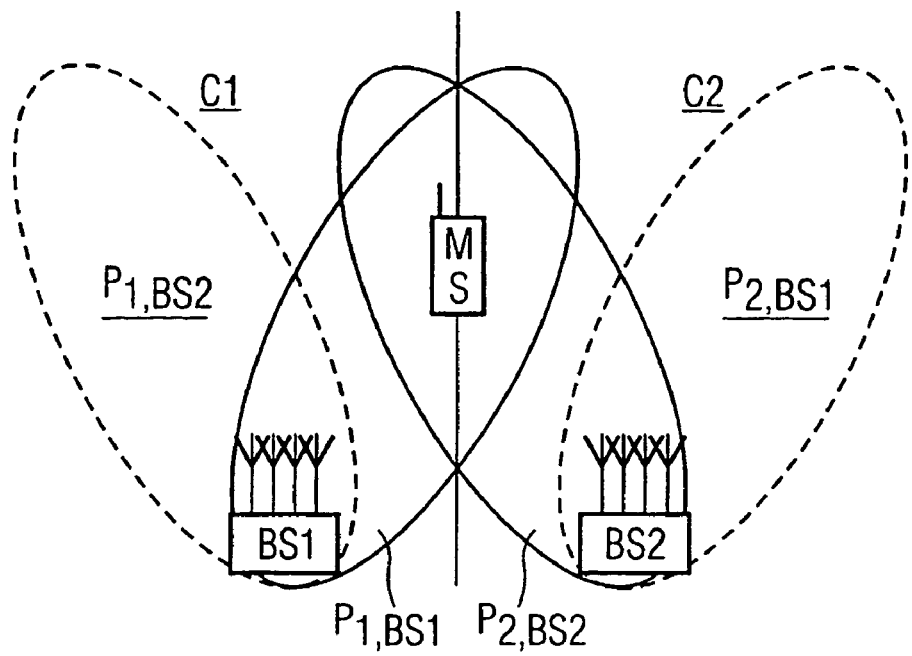
FIG. 3 shows a mobile radio communication system similar to that illustrated to FIG. 1 in which the method according to the present invention is used.

FIG. 3 shows a mobile station MS at the boundary between two radio cells C1, C2 of a mobile radio communication system. The radio cells C1, C2 are supplied by base stations BS1, BS2 which are interconnected via a data transmission network, also known as a core network (not shown in FIG. 3), via which they can exchange data with other base stations of the radio communication system or with a second telecommunication network connected to the data transmission network, or even jointly receive identical data intended for the same mobile station MS.

The two base stations BS1, BS2 use different scrambling codes for downlink transmission to the mobile stations in their relevant cells C1, C2 which enable the mobile station MS, in the case of a downlink signal received by it, to detect whether it originates from base station BS1 or BS2.

This enables the mobile station MS to assess the transmission channels between it and the two base stations BS1, BS2 individually and to create a covariance matrix R1, R2 for each base station individually. The covariance matrices are averaged over a sufficiently long period so that they are essentially independent of variations in reception conditions caused by short-term interference phenomena. Eigenvector analysis of the averaged covariance matrices performed by the mobile station MS provides a set of eigenvectors $W_{i,BSj}$, i=1,2, . . . , M, where M is the number of antennas of the base stations BS1, BS2, j=1,2. For each covariance matrix the eigenvector with the largest eigenvalue is selected, and the two eigenvectors thereby obtained are transmitted to the base stations BS1, BS2 as weighting vectors.

The transmission of the weighting vectors takes place in intervals ranging from a few seconds to minutes, as the base vectors change at a relatively slow rate depending of the movement speed of the mobile station. Between two base vector transmissions, the mobile station transmits only code words, here 1 bit long, which indicate to the base stations which of the two weighting vectors they are to use for transmitting to the mobile station.

After transmission of the weighting vectors, each base station BS1, BS2 therefore has the same set of two weighting vectors, one determined on the basis of its own downlink signal and the other originating from the downlink signal of the other base station. The radiation characteristics P1,BS1, P1,BS2, P2,BS1 and P2,BS2 of the two base stations BS1, BS2 correspond to the two base vectors. The characteristics P1,BS1 and P2,BS2 which correspond in each case to the use of an eigenvector by the base station on the basis of whose signal it was measured, are optimum for the mobile station MS, the other two characteristics are obviously unsuitable for communication with the mobile station MS.

As long as a mobile station is located in the core area of a cell (e.g., of the cell C1), and communicates exclusively with its base station BS1, both of the weighting vectors transmitted by the mobile station to the base station BS1 originate from measurements on the downlink signal of the base station BS1. By transmitting a one-bit code word, the mobile station MS can, in this case, specify to the base station BS1 which of the two weighting vectors it is to use in an upcoming timeslot of the downlink signal. For this purpose there exists an assignment rule between code word and weighting vector used; e.g., such that of two weighting vectors consecutively transmitted to the base station, the value "0" of the code word specifies the first and the value "1" the second.

As far as possible, an assignment rule of this kind must continue to apply to the base station BS1 even if, in the context of a handover, one of the two weighting vectors periodically transmitted from the mobile station to the two base stations involved is replaced by a weighting vector based on the downlink signal of the target base station BS2.

If the same assignment rule were to apply to the target base station BS2, in the case of the example considered here this would result in the two base stations, at a given point in time, using either the characteristics P1,BS2 and P2,BS2 or P1,BS1 and P2,BS1, with the result that only the downlink signal of one base station would be receivable at the subscriber station MS. To prevent this, the target base station BS2 must apply another assignment rule which in the basic example considered here may only state that the base station BS2 shall use the second transmitted weighting vector if the feedback word has the value "0" and the first transmitted weighting vector in the event of a feedback word "1". As such, by transmitting an identical feedback word to both base stations, the latter can use different weighting vectors.

If it is assumed that the mobile station MS first transmits the weighting vector measured for the original base station BS1 and then the weighting vector measured for the target base station BS2, transmission of the code word "0" then causes the base stations in each case to use the weighting vectors corresponding to the radiation characteristics P1,BS1, P2,BS2. As transmission of the code word "1" promises no improvement in reception, the same feedback code word "0" is transmitted for the entire duration of the soft handover.

To ensure that the target base station BS2 uses the correct assignment rule, it suffices for it to be suitably signaled to the effect that, for the connection to be established with the mobile station MS, it is the case of a handover and not of a new call setup. In the case of a new call setup, it must use the same first assignment rule as the base station BS1. When handover is complete, the base station BS2 also goes over to using the first assignment rule in communication with the mobile station MS. This takes place in dialog with the mobile station MS so that the latter can adjust to this and correctly select the code words sent to the base station BS2. A suitable time for changing the assignment rule, for example, is when, after handover, the mobile station MS first transmits an updated set of weighting vectors to the base station BS2. This procedure subsequently enables a new soft handover to another base station using exactly the same method as described above.

Alternatively, it is also possible for the base station BS2 to use the second assignment rule throughout its communication with the mobile station MS. In this case, however, it is necessary that, as part of the handover, information concerning the assignment rule used by the original base station BS1 be transmitted to the target base station BS2 to enable it to correctly select the assignment rule used by it. Thus, if a second handover from the base station BS2 to a third base station has to take place, this third base station has to "know" that BS2 is using the second rule in order, for its part, to be able to again select the first rule.

Figure 4:
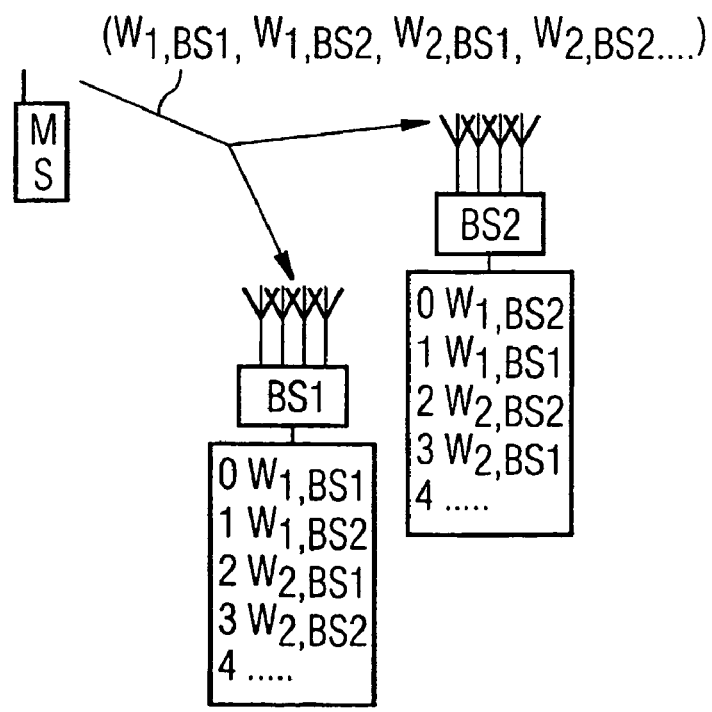
FIG. 4 schematically illustrates a first embodiment of the transmission of weighting vectors measured at a mobile station from the mobile station to two base stations and their processing in the base stations.

FIG. 4 illustrates a soft handover in a mobile communication system in which more than two weighting vectors are measured by the mobile station MS and transmitted to base stations communicating with it. The weighting vectors are determined as described above. The weighting vectors are transmitted to two base stations BS1, BS2 involved in a soft handover in a fixed sequence, odd-numbered positions 1, 3, . . . of the sequence being reserved for the transmission of weighting vectors $W_{1,BS1}$, $W_{2,BS1}$, . . . based on the downlink signal of the original base station BS1 and weighting vectors $W_{1,BS2}$, $W_{2,BS2}$, . . . based on the downlink signal of the target base station BS2 being transmitted at even-numbered positions 2, 4, . . . . The original base station BS1 stores the received weighting vectors in the order in which they are received and assigns them code words with the numerical values 0, 1, 2, . . . in this sequence. The target base station BS2, on the other hand, performs pairwise transposition of the weighting vectors, so that the code words 0, 1, 2, 3 correspond to weighting vectors $W_{1,BS2}$, $W_{1,BS1}$, $W_{2,BS2}$, $W_{2,BS1}$, etc. With this system, an albeit limited space diversity also can be used during soft handover; the code words 0, 2, 4, . . . correspond to suitable combinations of weighting vectors in the sense that each base station uses a weighting vector which has been defined on the basis of its own downlink signal.

Figure 5:
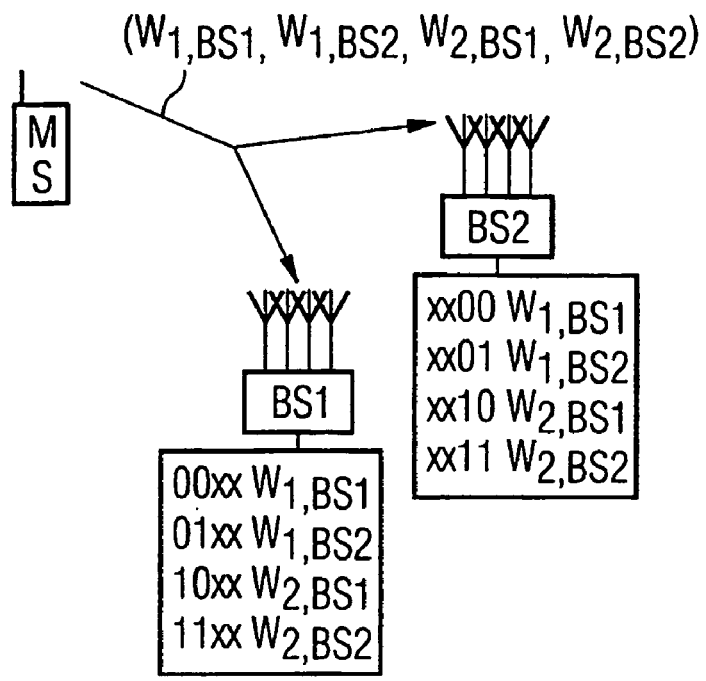
FIG. 5 schematically illustrates the transmission and processing of weighting vectors according to a second embodiment.

FIG. 5 shows a variant of the transmission and processing of the weighting vectors. In the system considered here, four weighting vectors $W_{i,BSj}$ i=1, 2, j=1, 2 are measured which stand for the two best transmission paths of each base station BSj to the subscriber station MS. The weighting vectors are written to four storage locations of the base stations in the sequence in which they are transmitted. To select the weighting vectors to be used by the base stations, the subscriber station MS transmits four-bit code words.

Of these, the original base station BS1 analyzes the first two in each case; the last two are ignored, which in FIG. 5 is symbolically represented by letters xx at the corresponding positions of the code word. The target base station BS2, conversely, only analyzes the last two bits of the code word and ignores the first two; i.e., there are in total 16 code words of which four in each case specify the weighting vector at one of the two base stations BS1, BS2.

Figure 6:
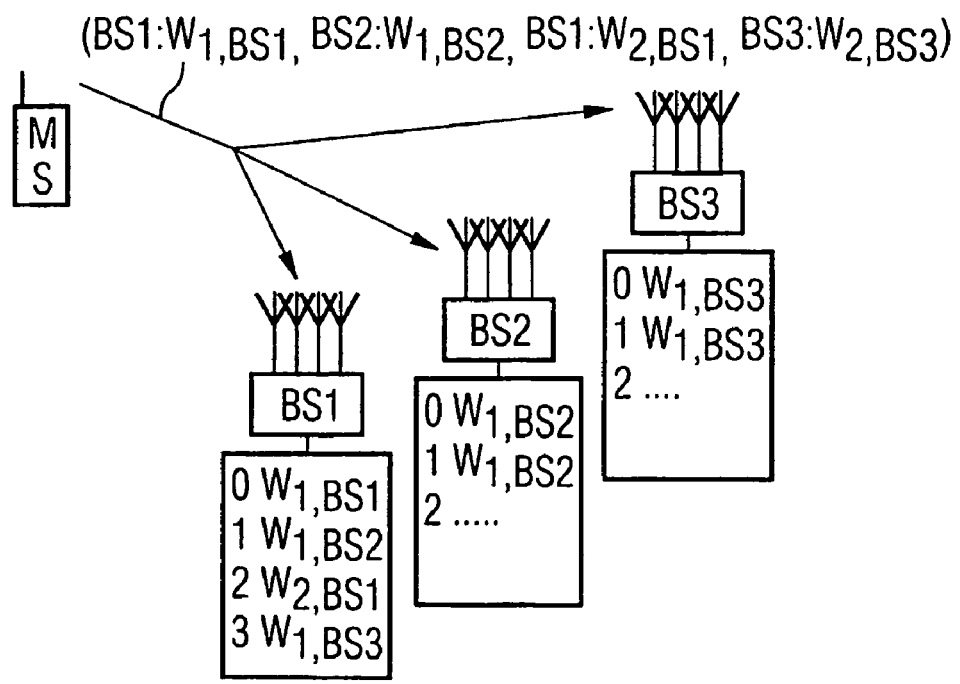
FIG. 6 schematically illustrates the transmission and processing of weighting vectors according to a third embodiment.

FIG. 6 shows a situation in which a mobile station simultaneously receives a downlink signal from three base stations. It transmits weighting vectors determined on the basis of these downlink signals together with an identifier BS1:, BS2: or BS3: which specifies, for each vector, the base station on the basis of whose downlink signal it was measured. The weighting vectors (four in this example) are received by all three base stations, the base stations detecting from the number of identifiers relating to them whether or not the subscriber station requires them to transmit with changing weighting vectors: the base stations BS2, BS3 which in each case receive only one weighting vector relating to them enter this weighting vector W1,BS2 or W1,BS3 at least at the locations 0 and 1 of their store. The base station BS1, on the other hand, which has received more than one weighting vector relating to it, detects from this that it is to employ diversity and enters the two vectors W1,BS1, W2,BS1 at the locations 0, 1 of its store. Using a 1-bit code word 0 or 1, the subscriber station may now select from the two vectors W1,BS1, W2,BS1 at the base station BS1, whereas the other base stations always use the vector W1,BS2 or W1,BS3 determined as being optimum for them. The option of selecting between operation with changing weighting vectors for one base station and operation with a single weighting vector for another base station also is, of course, possible in a scenario where there are only two base stations, if one of the stations only receives one vector relating to it and all the other vectors relate to the other station, or if two identical weighting vectors are transmitted to a base station.

Although the present invention has been described with reference to specific embodiments, those of skill in the art will recognize that changes may be made thereto without departing from the spirit and scope of the present invention as set forth in the hereafter appended claims.

The invention claimed is:

1. A method for controlling beam formation of a downlink signal radiated from base stations of respective first and second radio cells to a mobile station in a mobile radio communication system, the base station respectively having a plurality of antennas and being set up for weighted radiation of a downlink signal to the mobile station using a weighting vector, the method comprising the steps of:

specifying a set of weighting vectors at the mobile station and the base stations of the first and second radio cells, each weighting vector being assigned at least one code word;

selecting an optimum weighting factor at the mobile station and transmitting a code word assigned to the optimum weighting vector to the base stations; and performing weighted radiation of the downlink signal using the weighting vector assigned to the code word at each of the base stations;

wherein the weighting vectors are differently assigned to the code words at the base stations of the first and second radio cells so that the base stations weight the downlink signal using different weighting vectors on receipt of an identical code word, with at least some of the weighting vectors being defined to initiate simultaneous transmission of downlink signals via the plurality of antennas of a base station.

2. A method for controlling beam formation of a downlink signal as claimed in claim 1, wherein the set of weighting vectors is defined to respectively contain at least one weighting vector corresponding to a transmission path of the first radio cell and at least one weighting vector corresponding to a transmission path of the second radio cell, and wherein an identical code word is assigned to the weighting vector assigned to the first radio cell at the base station of the first radio cell and to the weighting vector assigned to the second radio cell at the base station of the second radio cell.

3. A method for controlling beam formation of a downlink signal as claimed in claim 2, wherein the downlink signal is additionally radiated by a base station of at least a third radio cell, with the set of weighting vectors including at least one further weighting vector corresponding to a transmission path of the at least third radio cell and with the at least one further weighting vector being assigned the same code word at the base station of the at least third radio cell.

4. A method for controlling beam formation of a downlink signal as claimed in claim 3, wherein to define the set of weighting vectors, weighting vectors are measured at the mobile station and transmitted in sequence to the base stations, with a first group of positions in the sequence being reserved for the transmission of weighting vectors corresponding to a transmission path of the first radio cell, and another group of positions being reserved for the transmission of weighting vectors corresponding to a transmission path of another radio cell.

5. A method for controlling beam formation of a downlink signal as claimed in claim 4, wherein the mobile station transmits information concerning a number of groups to the base stations.

6. A method for controlling beam formation of a downlink signal as claimed in claim 4, wherein the positions of the various groups follow one another cyclically in the sequence.

7. A method for controlling beam formation of a downlink signal as claimed in claim 2, wherein to define the set of weighting vectors, weighting vectors are measured at the mobile station and respectively transmitted to the base stations in conjunction with an indicator designating the radio cell of the transmission path to which the transmitted weighting vector corresponds.

8. A method for controlling beam formation of a downlink signal as claimed in claim 2, wherein the base stations employ two different rules for assigning a weighting vector to a code word transmitted by the mobile station.

9. A method for controlling beam formation of a downlink signal as claimed in claim 8, wherein in the two rules, each code word is assigned a weighting vector corresponding to a transmission path of one radio cell and a weighting vector corresponding to a transmission path of the other radio cell.

10. A method for controlling beam formation of a downlink signal as claimed in claim 8, wherein at least one of the base stations employs a first rule in which each code word is assigned a different weighting factor, and wherein at least one other base station employs a second rule whereby each code word is assigned the same weighting vector.

11. A method for controlling beam formation of a downlink signal as claimed in claim 10, wherein the set of weighting vectors includes two vectors, the code word corresponding to the weighting vector assigned to the first radio cell at the base station of the first radio cell and corresponding to the weighting vector assigned the second radio cell at the base station of the second radio cell that is transmitted to the base station, and thereafter for duration of the hand over, the selection of weighting vectors used by the base stations remains unchanged.

12. A method for controlling beam formation of a downlink signal as claimed in claim 10, wherein when handover is complete, the base station of the second radio cell continues to use the second rule and, upon a further handover to a third radio cell, the base station of the second radio cell again uses the first rule.

13. A method for controlling beam formation of a downlink signal as claimed in claim 10, wherein when handover is complete, the base station of the second radio cell switches to use the first rule.

14. A method for controlling beam formation of a downlink signal as claimed in claim 8, wherein at least one of the base stations employs a first rule in which a plurality of code words are assigned to an identical weighting vector, and wherein at least one other base station employs a second rule in which the plurality of code words are assigned different weighting vectors in each case.

15. A method for controlling beam formation of a downlink signal as claimed in claim 14, wherein the code words include first and second bits, with the first bits specifying the weighting vector used by one base station and the second bits specifying the weighting vector used by another base station.

16. A method for controlling beam formation of a downlink signal as claimed in claim 14, wherein when handover is complete, the base station of the second radio cell continues to use the second rule and, upon a further handover to a third radio cell, the base station of the second radio cell again uses the first rule.

17. A method for controlling beam formation of a downlink signal as claimed in claim 14, wherein when handover is complete, the base station of the second radio cell switches to use the first rule.

18. A method for controlling beam formation of a downlink signal as claimed in claim 1, wherein at the mobile station, a covariance matrix is computed for each base station and at least one weighting vector from eigenvectors of each covariance matrix is specified.

19. A method for controlling beam formation of a downlink signal as claimed in claim 1, wherein the method is used in connection with a soft handover between the first and second radio cells.

20. A base station in a mobile radio communication system for use in a method for controlling beam formation of a downlink signal radiated from base stations of respective first and second radio cells to a mobile station in the mobile radio communication system, comprising:
   a plurality of antennas;
   parts for weighting radiation of a downlink signal to the mobile station using a weighting vector selected on a basis of a code word transmitted by the mobile station; and
   parts for selectively using one of at least two different rules for selecting the weighting vectors based on the transmitted code word, the rule to be used being signaled to the base station via the mobile station.

21. A base station for a mobile radio communication system as claimed in claim 20, wherein the base station may be used together with at least one other base station, with the base station and the at least one other base station employing different rules.

* * * * *